US012804436B2

(12) United States Patent
Liu

(10) Patent No.: US 12,804,436 B2
(45) Date of Patent: Nov. 17, 2026

(54) GAP CONFIGURATION METHOD AND APPARATUS, AND DEVICE AND STORAGE MEDIUM

(71) Applicant: VIVO MOBILE COMMUNICATION CO., LTD., Dongguan (CN)

(72) Inventor: Xuanbing Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 434 days.

(21) Appl. No.: 18/241,385

(22) Filed: Sep. 1, 2023

(65) Prior Publication Data

US 2023/0413094 A1 Dec. 21, 2023

Related U.S. Application Data

(63) Continuation of application No. PCT/CN2022/078867, filed on Mar. 2, 2022.

(30) Foreign Application Priority Data

Mar. 4, 2021 (CN) ......................... 202110241662.8

(51) Int. Cl.
*H04W 24/10* (2009.01)
*H04W 88/06* (2009.01)

(52) U.S. Cl.
CPC ............ *H04W 24/10* (2013.01); *H04W 88/06* (2013.01)

(58) Field of Classification Search
CPC ................. H04W 24/10; H04W 88/06; H04W 36/0088; H04W 8/183; H04W 24/02
See application file for complete search history.

(56) References Cited

U.S. PATENT DOCUMENTS

| | | | |
|---|---|---|---|
| 10,623,946 B1 | 4/2020 | Kumar et al. | |
| 2020/0359196 A1 | 11/2020 | Balasubramaniam et al. | |
| 2022/0046450 A1 | 2/2022 | Wang | |
| 2022/0174623 A1* | 6/2022 | Zheng | H04W 56/001 |
| 2022/0217675 A1* | 7/2022 | Chen | H04W 68/02 |
| 2022/0279469 A1 | 9/2022 | Ingale et al. | |
| 2024/0129904 A1* | 4/2024 | Cabrera Mercader | H04W 72/0446 |
| 2024/0357632 A1* | 10/2024 | Wang | H04W 60/005 |

FOREIGN PATENT DOCUMENTS

| | | | |
|---|---|---|---|
| CN | 109691164 A | 4/2019 |
| CN | 111586779 A | 8/2020 |
| EP | 4142349 A1 | 3/2023 |
| JP | 2019121828 A | 7/2019 |

(Continued)

OTHER PUBLICATIONS

Samsung, "Discussion on switching mechanism for multi-SIM", 3GPP TSG-RAN WG2 Meeting #112-e, Online, Nov. 2-13, 2020, R2-2010350.

(Continued)

*Primary Examiner* — Habte Mered
(74) *Attorney, Agent, or Firm* — The Webb Law Firm

(57) ABSTRACT

A gap configuration method includes receiving, by a terminal, first configuration information transmitted by a network-side device, where the first configuration information includes configuration information of a target gap; and executing, by the terminal, a target task based on the configuration information of the target gap. The target task includes a measurement task and/or a non-measurement task.

20 Claims, 3 Drawing Sheets

(56) References Cited

FOREIGN PATENT DOCUMENTS

| | | | |
|---|---|---|---|
| WO | 2020191683 | A1 | 10/2020 |
| WO | 2021025491 | A1 | 2/2021 |
| WO | 2021213495 | A1 | 10/2021 |

OTHER PUBLICATIONS

Vivo, "[post112-e][256][Multi-SIM] Network switching details (vivo)", 3GPP TSG-RAN WG2 Meeting #113-e, Online, Jan. 25-Feb. 5, 2021, R2-2102262.

Vivo, "Discussion on Switching Notification Procedure", 3GPP TSG-RAN WG2 Meeting #113-e, E-Meeting, Jan. 25-Feb. 5, 2021, R2-2100475.

Vivo, "Discussion on MUSIM Gap Configuration and switching message", 3GPP TSG-RAN WG2 Meeting #116-e, E-Meeting, Nov. 1-12, 2021, R2-2110393.

Intel Corporation, "Discussion on multiple and independent concurrent measurement gaps in NR", 3GPP TSG-RAN WG4 Meeting # 98-e, Electronic Meeting, Jan. 25-Feb. 5, 2021, R4-210270.

* cited by examiner

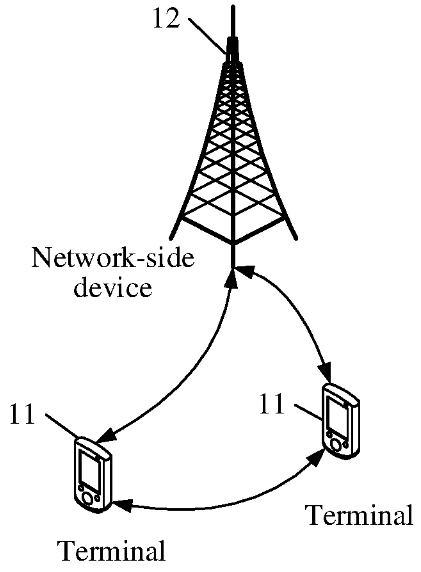

FIG. 1

Receive, by a terminal, first configuration information transmitted by a network-side device, where the first configuration information includes configuration information of a target gap — 200

↓

Execute, by a terminal, a target task based on the configuration information of the target gap, where the target task includes a measurement task and/or a non-measurement task — 210

FIG. 2

Determine, by a network-side device, configuration information of a target gap — 300

↓

Transmit, by the network-side device, first configuration information to a terminal, where the first configuration information includes the configuration information of the target gap; the configuration information of the target gap is used for instructing the terminal to execute a target task at the target gap, and the target task includes a measurement task and/or a non-measurement task — 310

FIG. 3

GAP CONFIGURATION METHOD AND APPARATUS, AND DEVICE AND STORAGE MEDIUM

CROSS-REFERENCE TO RELATED APPLICATIONS

This application is a Bypass Continuation application of International Patent Application No. PCT/CN2022/078867 filed Mar. 2, 2022, and claims priority to Chinese Patent Application No. 202110241662.8 filed Mar. 4, 2021, the disclosures of which are hereby incorporated by reference in their entireties.

BACKGROUND OF THE INVENTION

Field of the Invention

The present application belongs to the technical field of communications, and in particular, to a gap configuration method and apparatus, a device, and a storage medium.

Description of Related Art

At present, there are not only single-SIM terminals, but also dual-SIM or multi-SIM terminals, collectively referred to as multi-SIM terminals. The capabilities of the multi-SIM terminal may be single input single output, dual input single output, and dual input dual output, and the like. One feature of a multi-SIM terminal is that it can reside in a plurality of networks at the same time.

In the prior art, a network configures a measurement gap for a terminal, so that the terminal performs a measurement task, such as a new radio (NR) measurement task, or a long term evolution (LTE) measurement task, or other similar measurement tasks, i.e., the existing gaps are mainly used for the measurement tasks. For some terminals, if dual-SIM tasks are to be performed, such as tasks in an idle mode, e.g., paging, measurement, cell search, background public land mobile network search (PLMN Search), and the like, the measurement gap cannot support the terminal to complete all types of multi-SIM tasks.

SUMMARY OF THE INVENTION

Embodiments of the present application provide a gap configuration method and apparatus, a device, and a storage medium.

In a first aspect, a gap configuration method is provided, which includes:

receiving, by a terminal, first configuration information transmitted by a network-side device, where the first configuration information includes configuration information of a target gap; and executing, by the terminal, a target task based on the configuration information of the target gap; where the target task includes a measurement task and/or a non-measurement task.

In a second aspect, a gap configuration method is provided, which includes:

determining, by a network-side device, configuration information of a target gap; and transmitting, by the network-side device, first configuration information to a terminal, where the first configuration information includes the configuration information of the target gap; where the configuration information of the target gap is used for instructing the terminal to execute a target task at the target gap, and the target task includes a measurement task and/or a non-measurement task.

In a third aspect, a gap configuration apparatus is provided, which includes:

a first receiving module, configured to receive first configuration information transmitted by a network-side device, where the first configuration information includes configuration information of a target gap; and a first execution module, configured to execute a target task based on the configuration information of the target gap; where the target task includes a measurement task and/or a non-measurement task.

In a fourth aspect, a gap configuration apparatus is provided, which includes:

a first determination module, configured to determine configuration information of a target gap; and a first transmission module, configured to transmit first configuration information to a terminal, where the first configuration information includes the configuration information of the target gap; where the configuration information of the target gap is used for instructing the terminal to execute a target task at the target gap, and the target task includes a measurement task and/or a non-measurement task.

In a fifth aspect, a terminal is provided, which includes a processor, a memory, and a program or instruction stored on the memory and executable on the processor, and when executed by the processor, the program or instruction implements the steps of the method according to the first aspect.

In a sixth aspect, a network-side device is provided, which includes a processor, a memory, and a program or instruction stored on the memory and executable on the processor, and when executed by the processor, the program or instruction implements the steps of the method according to the first aspect.

In a seventh aspect, a non-transitory readable storage medium is provided, which stores a program or instruction, and when executed by a processor, the program or instruction implements the steps of the method according to the first aspect or implements the steps of the method according to the second aspect.

In an eighth aspect, a chip is provided, which includes a processor and a communication interface; the communication interface is coupled to the processor; and the processor is configured to run a program or instruction to implement the steps of the method according to the first aspect or implement the steps of the method according to the second aspect.

BRIEF DESCRIPTION OF THE DRAWINGS

FIG. 1 is a block diagram of a wireless communication system to which embodiments of the present application can be applied;

FIG. 2 is a schematic flowchart of a gap configuration method according to an embodiment of the present application;

FIG. 3 is another schematic flowchart of a gap configuration method according to an embodiment of the present application;

DESCRIPTION OF THE INVENTION

Figure 4:
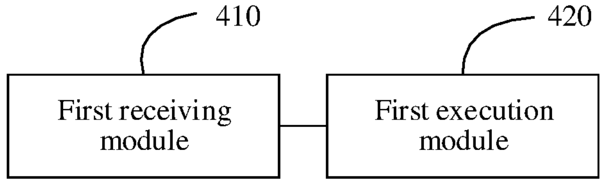
FIG. 4 is a schematic structural diagram of a gap configuration apparatus according to an embodiment of the present application.

The technical solutions in embodiments of the present application will be clearly described in the following with reference to the accompanying drawings in the embodiments of the present application. Apparently, the described embodiments are merely some rather than all of the embodiments of the present application. All other embodiments obtained by persons skilled in the art based on the embodiments of the present application fall within the scope of protection of the present application.

The terms "first", "second" and the like in the specification and claims of the present application are used for distinguishing similar objects, but are not used for describing a particular sequence or order. It is to be understood that the data used in this way is exchangeable in a proper case, so that the embodiments of the present application can be implemented in an order different from the order shown or described herein; and the objects distinguished by "first" and "second" are usually the same type, and the number of the objects is not limited, for example, a first object may be one or more. In addition, "and/or" used in the specification and the claims represents at least one of the connected objects, and the character "/" generally represents that the connected objects are in an "or" relationship.

It is to be noted that the technology described by the embodiments of the present application is not limited to the long term evolution (LTE)/LTE-advanced (LTE-A) system, but can also be used for other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" used in the embodiments of the present application are usually exchangeable, and the technology described in the present application can be applied to the systems and radio technologies mentioned above, and can also be applied to other systems and radio technologies. The following description describes a new radio (NR) system for the purpose of example and uses the term NR in most of the description below, but these technologies can also be applied to applications other than NR system applications, such as 6th generation (6G) communication systems.

FIG. 1 illustrates a block diagram of a wireless communication system to which embodiments of the present application can be applied. The wireless communication system includes a terminal 11 and a network-side device 12. The terminal 11 may also be referred to as a terminal device or user equipment (UE), and the terminal 11 may be a mobile phone, a tablet personal computer, a laptop computer or referred to as a notebook computer, a personal digital assistant (PDA), a palmtop, a netbook, an ultra-mobile personal computer (UMPC), a mobile Internet device (MID), an augmented reality (AR)/virtual reality (VR) device, a robot, a wearable device, vehicle equipment (VUE), pedestrian equipment (PUE), smart home (home equipment with wireless communication function, such as refrigerator, television, washing machine or furniture, or the like), a game machine, a personal computer (PC), a teller machine or a self-service machine and other terminal-side devices. The wearable device includes: smart watches, smart hand rings, smart earphones, smart glasses, smart jewelry (smart bracelets, smart wrist chains, smart rings, smart necklaces, smart anklets, smart ankle chains, or the like), smart wristbands, smart clothing, and the like. It is to be noted that the specific type of the terminal 11 is not limited in this embodiment of the present application. The network-side device 12 may include an access network device or a core network device. The access network device 12 may also be referred to as a radio access network device, a radio access network (RAN), a radio access network function or a radio access network unit. The access network device 12 may include a base station, a WLAN access point or a WiFi node, and the like, and the base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a WiFi node, a transmitting receiving point (TRP) or some other suitable terms in the art, and as long as the same technical effect is achieved, the base station is not limited to a specific technical term, and it is to be noted that in this embodiment of the present application, only a base station in an NR system is taken as an example, but the specific type of the base station is not limited. The core network device may include, but is not limited to, at least one of: a core network node, a core network function, a mobility management entity (MME), an access and mobility management function (AMF), a session management function (SMF), a user plane function (UPF), a policy control function (PCF), a policy and charging rule function unit (PCRF), an edge application server discovery function (EASDF), unified data management (UDM), unified data repository (UDR), a home subscriber server (HSS), centralized network configuration (CNC), a network repository function (NRF), a network exposure function (NEF), local NEF (L-NEF), a binding support function (BSF), an application function (AF), or the like. It is to be noted that in this embodiment of the present application, only a core network device in an NR system is used as an example for description, but the specific type of the core network device is not limited.

The gap configuration method and apparatus provided by this embodiment of the present application will be described in detail below through some embodiments and application scenarios thereof with reference to the accompanying drawings.

FIG. 2 is a schematic flowchart of a gap configuration method according to an embodiment of the present application, and as shown in FIG. 2, the method includes the following steps:

Step 200: A terminal receives first configuration information transmitted by a network-side device, where the first configuration information includes configuration information of a target gap; and the terminal executes a target task based on the configuration information of the target gap.

The target task includes a measurement task and/or a non-measurement task.

In a communication system, a time-division pattern, i.e., a time-division multiplexing pattern (TDM Pattern) is usually used to solve a task scheduling problem that the terminal has a resource conflict, for example, a measurement gap is configured in a single-SIM terminal to execute pilot frequency measurement, wireless access technology (Inter-RAT, IRAT) measurement, and the like.

The network-side device can configure the measurement gap for the terminal, so that the terminal executes an NR measurement task.

The network-side device can allocate the measurement gap, and the terminal can execute a measurement task using the allocated measurement gap.

The terminal can report the requirements for the measurement gap, including whether the gap is required, and the frequency band requiring the gap, the same-frequency measurement, pilot frequency measurement and Inter-RAT measurement requiring the gap, and the like.

The gap measurement configuration field description table below in Table 1 shows some common measurement gaps.

TABLE 1

| Measurement gap Configuration Field Description Table |
| --- |
| MeasGapConfig field descriptions |
| gapFR1 |
| Indicates measurement gap configuration that applies to FR1 only. |
| gapFR2 |
| Indicates measurement gap configuration applies to FR2 only. |
| gapUE |
| Indicates measurement gap configuration that applies to all frequencies (FR1 and FR2). |

FR1 and FR2 are frequency range 1 Frequency Range 1 and frequency range 2 Frequency Range 2.

Alternatively, to overcome the defect that the measurement gap cannot support the UE to complete all types of multi-SIM tasks, a new configuration of the gap can be designed to meet the requirements of various types of target tasks, such as measurement tasks and/or non-measurement tasks.

Alternatively, after determining the configuration information of the target gap, the network-side device can transmit the configuration information of the target gap to the terminal.

Alternatively, the network-side device can transmit the first configuration information to the terminal, where the first configuration information includes the configuration information of the target gap.

Alternatively, after receiving the configuration information of the target gap, the terminal can determine the target gap based on the configuration information of the target gap, and can also use the target gap to execute the target task.

Alternatively, a gap attribute field set or gap pattern of the target gap is an optionally configured gap type; which is different from gapFR2, gapFR1, gapUE and other gaps.

Alternatively, the terminal UE1 can receive a first configuration message transmitted by the network-side device, and the first configuration message can optionally include the configuration information of the target gap.

Alternatively, the target gap can be used by UE1 to execute the target task, such as a multi-SIM task, conversion of UE1 to other networks, and the like.

Alternatively, during the use the target gap, i.e., the target gap enters into force, UE1 can use the target gap to stop data transceiving; or continue normal data transceiving without using the target gap.

According to this embodiment of the present application, the terminal receives the configuration information of the target gap transmitted by the network-side device, and executes the measurement task and/or the non-measurement task based on the target gap; and by designing the configuration of the target gap, the gap requirements of multiple multi-SIM tasks are efficiently supported, and the impact of the multi-SIM tasks on the terminal data throughput is reduced.

Alternatively, the target task includes:

a multi-SIM task, where the multi-SIM task is a measurement task and/or a non-measurement task of other terminals, and the other terminals are associated with the terminal.

Alternatively, one feature of a multi-SIM terminal is that it can reside in a plurality of networks at the same time, but the implementation methods of the multi-SIM terminal are different, and some terminals can perform transmitting and receiving at the same time in a plurality of networks without affecting each other. There is also a multi-SIM terminal, and although the terminal can reside in a plurality of networks at the same time, it can reside in two networks in a time division manner, i.e., for a period of time, UE1 resides in a network A to subject to paging of the network A, and for another period of time, UE1 resides in a network B to subject to paging of the network B. Alternatively, UE1 can connect to transceive data over the network A for a period of time, and UE1 can receive paging over the network B for another period of time. Alternatively, UE1 can receive data over the network A for a period of time, and UE1 can establish a connection or transceive data over the network B for another period of time.

Alternatively, the multi-SIM task is a measurement task and/or a non-measurement task of other UE2.

Alternatively, UE1 can execute the measurement task and/or the non-measurement task for UE2 at the target gap.

Alternatively, UE 1 is the terminal.

Alternatively, UE2 is the other terminal.

Alternatively, UE1 and UE2 may belong to a same physical device; such as SIM1 and SIM2 in a dual-SIM mobile phone.

Alternatively, UE1 and UE2 may be two associated UEs, such as a mobile terminal and a device communicated with the mobile terminal, and the device can communicate with the network-side device.

Alternatively, UE1 and UE2 may belong to a same user; such as SIM1 and virtual SIM SIM2 in a mobile phone.

Alternatively, the target task includes:

a multi-SIM task, where the multi-SIM task is a task of other terminals, and the other terminals are associated with the terminal.

Alternatively, the target task includes:

a multi-SIM task, where the multi-SIM task is a task of other terminals, and the other terminals and the terminal are terminals belonging to a same device.

Alternatively, the configuration information of the target gap includes:

configuration information for configuring an independent target gap.

The independent target gap is configured separately, or the independent target gap is configured together with at least one measurement gap.

Alternatively, the target gap configuration can be implemented in a variety of ways, including an independent target gap and/or a non-independent target gap, where:

the independent target gap can coexist with the traditional measurement gap or exist separately; and the non-independent target gap, for example, configures a target gap pattern based on a certain measurement gap.

Alternatively, the network-side device can configure an independent target gap for the terminal, and therefore the configuration information of the target gap may include: configuration information for configuring the independent target gap.

Alternatively, the independent target gap can be configured separately, for example, the network-side device can configure only the target gap.

Alternatively, the independent target gap is configured together with at least one measurement gap, for example, the network-side device can configure the target gap and one or more of the measurement gaps (such as gapFR2, gapFR1, and gapUE).

For example, the network-side device can configure the target gap and gapFR1 simultaneously.

For example, the network-side device can configure the target gap, gapFR1, and gapFR2 simultaneously.

Alternatively, the configuration information of the independent target gap includes at least one of:

a reference service cell where the target gap is located, and/or a cell group where the target gap is located;

an offset of the target gap;

a length of the target gap;

a period of the target gap;

or a frequency range of the target gap.

Alternatively, the configuration information of the independent target gap may include, but is not limited to, any one or any combination of the following:

a reference service cell where the target gap is located;

a cell group (a master cell group (MCG) and a secondary cell group (SCG)) where the target gap is located;

an offset of the target gap;

a length of the target gap;

a period of the target gap; and a frequency range of the target gap.

For example, the network-side device can configure the target gap: GapMsim in an RRC reconfiguration message, or configure the target gap: GapMsim in MeasGapConfig IE.

The network-side device can configure an attribute of the target gap, including:

the reference service cell (refServCellMsim-rxx) where the target gap is located, such as a master cell or a master-secondary cell;

the period of the target gap (mgrp-rxx), a value range, and an enumeration of {ms320, ms640, ms1280, ms2560};

the offset of the target gap (gapOffset-rxx), integer (0-2559);

the length of the target gap (mgl-rxx), N milliseconds, N being an integer; and the frequency range of the target gap, an enumeration of {FR1, FR2, FR1 and FR2}; where "FR1 and FR2" indicate that the target Gap can be applied to FR1 and FR2, and can also be indicated by "UE".

In an attribute name, -rxx represents Release 17, Release 18, and the like.

Alternatively, the frequency range of the target gap may include FR1 and/or FR2.

Alternatively, the executing a target task based on the configuration information of the target gap includes:

using the configuration information of the independent target gap; and ignoring configuration information in a same cell with the configuration information of the independent target gap and configuring a same information type as the configuration information of the target gap.

Alternatively, in a case that the target task is executed based on the configuration information of the target gap, the configuration information of the target gap can be used.

Alternatively, for the configuration information of other gaps which is in the same cell with the configuration information of the target gap and configures the same information type as the configuration information of the target gap, the terminal can ignore the configuration information of the other gaps.

For example, the following configuration information is taken as an example:

```
GapConfig ::= SEQUENCE {
gapOffset INTEGER (0..159),
mgl ENUMERATED {ms1dot5, ms3, ms3dot5, ms4, ms5dot5, ms6},
mgrp ENUMERATED {ms20, ms40, ms80, ms160},
mgta ENUMERATED {ms0, ms0dot25, ms0dot5},
...,
[[
        refServCellIndicator ENUMERATED {pCell, pSCell, mcg-FR2} OPTIONAL --
Cond NEDCorNRDC
        ]],
        [[
        refFR2ServCellAsyncCA-r16 ServCellIndex OPTIONAL, -- Cond AsyncCA
        mgl-r16 ENUMERATED {ms10, ms20} OPTIONAL -- Cond PRS
        ]],
        [[
        refServCellMsim-rxx ENUMERATED {pCell, pSCell} OPTIONAL, -- Cond
MSIM
        gapOffset-rxx INTEGER (0..2559) OPTIONAL, -- Cond MSIM
        mgl-rxx ENUMERATED {ms30, ms40, ms50, ms60} OPTIONAL, -- Cond
MSIM
        mgrp-rxx ENUMERATED {ms320, ms640, ms1280, ms2560} OPTIONAL --
Cond MSIM
        ]]
        }
```

The one with a suffix "-rxx" is the configuration information of the target gap, and the gapOffset INTEGER (0 . . . 159) and the gapOffset-rxx INTEGER (0 . . . 2559) OPTIONAL, —Cond MSIM are configured in the same cell; in this case, the configuration information of the target gap is used when using the target gap, while the configuration information of the gapOffset INTEGER (0 . . . 159) is ignored. Other types of configuration information may be deduced by analogy.

The condition "Cond MSIM" indicates that this field optionally exists when configuring the gap pattern for the terminal UE to execute the target task, such as a multi-SIM task. Otherwise, this field does not exist.

Alternatively, for a gap, the types configured by the configuration information include any one of the following:

a reference service cell where the gap is located;

a cell group (a MCG, and an SCG) where the gap is located;

an offset of the gap;

a length of the gap;

a period of the gap; and a frequency range of the gap.

Alternatively, for a gap, such as the configuration information of the target gap, it may be referred to as a gap attribute field set gap pattern of the target gap, in which a plurality of attribute thresholds are included, and each attribute threshold corresponds to one of the above types.

Alternatively, the independent target gap partially overlaps or completely overlaps with at least one measurement gap.

Alternatively, a plurality of gaps may overlap, including complete overlapping and partial overlapping.

Alternatively, the independent target gap can partially overlap or completely overlap with any other measurement gap.

Alternatively, the executing a target task based on the configuration information of the target gap includes at least one of:

using the longest gap of all the overlapped gaps to execute a task corresponding to the longest gap, where all the overlapped gaps include the independent target gap and the measurement gap partially overlapped or completely overlapped with the independent target gap;

executing the target task using the independent target gap; or ignoring a first measurement task, where the first measurement task is a task corresponding to the measurement gap partially overlapped or completely overlapped with the independent target gap.

Alternatively, when the gap time overlaps, the terminal can use the longest gap of all the overlapped gaps to execute the corresponding task.

Alternatively, when the gap time overlaps, the terminal can use the target gap to execute the target task, such as a multi-SIM task.

Alternatively, when the gap time overlaps, the terminal can ignore other measurement gap purposes.

Alternatively, the configuration information of the target gap includes:

configuration information for configuring a non-independent target gap based on configuration of a first measurement gap in the first measurement gap, where the non-independent target gap corresponds to a same reference service cell as the first measurement gap.

Alternatively, the target gap configuration can be implemented in a variety of ways, including an independent target gap and/or a non-independent target gap, where:

the independent target gap can coexist with the traditional measurement gap or exist separately; and the non-independent target gap, for example, configures a target gap pattern based on a certain measurement gap.

Alternatively, for an existing first measurement gap, when a certain attribute, such as the length, of the first measurement gap cannot satisfy the execution of the target task, a non-independent target gap can be configured based on the configuration of the first measurement gap to meet the requirements of the task, and therefore the configuration information of the target gap may include the configuration information for configuring the non-independent target gap.

Alternatively, the non-independent target gap may correspond to a same reference service cell as any other gap.

During the use of the non-independent target gap, UE1 can use the non-independent target gap to stop data transceiving; or continue data transceiving without using the non-independent target gap.

Alternatively, the configuration information of the non-independent target gap includes at least one of:

an offset of the target gap;

a length of the target gap;

a period of the target gap;

or a frequency range of the target gap.

Alternatively, the configuration information of the non-independent target gap may include, but is not limited to, any one or any combination of the following:

an offset of the target gap;

a length of the target gap;

a period of the target gap; and a frequency range of the target gap.

For example, the network-side device can configure the target gap: GapMsim in an RRC reconfiguration message, or configure the gap pattern of the target gap: GapMsim in MeasGapConfig IE.

The network-side device can configure an attribute of the target gap, including:

the period of the target gap (mgrp-rxx), a value range, and an enumeration of {ms320, ms640, ms1280, ms2560};

the offset of the target gap (gapOffset-rxx), integer (0-2559); and the length of the target gap (mgl-rxx), N milliseconds, N being an integer.

In an attribute name, -rxx represents Release 17, Release 18, and the like.

In some embodiments, the configuration can be expressed as:

```
GapConfig ::= SEQUENCE {
gapOffset INTEGER (0..159),
mgl ENUMERATED {ms1dot5, ms3, ms3dot5, ms4, ms5dot5, ms6},
mgrp ENUMERATED {ms20, ms40, ms80, ms160},
mgta ENUMERATED {ms0, ms0dot25, ms0dot5},
...,
```

-continued

```
        [[
        refServCellIndicator ENUMERATED {pCell, pSCell, mcg-FR2} OPTIONAL --
Cond NEDCorNRDC
        ]],
        [[
        refFR2ServCellAsyncCA-r16 ServCellIndex OPTIONAL, -- Cond AsyncCA
        mgl-r16 ENUMERATED {ms10, ms20} OPTIONAL -- Cond PRS
        ]],
        [[
        gapOffset-rxx INTEGER (0..2559) OPTIONAL, -- Cond MSIM
        mgl-rxx ENUMERATED {ms30, ms40, ms50, ms60} OPTIONAL, -- Cond
MSIM
        mgrp-rxx ENUMERATED {ms320, ms640, ms1280, ms2560} OPTIONAL --
Cond MSIM
]]
}
```

The part with a suffix "-rxx" is the configuration information part of the target gap.

The condition "Cond MSIM" indicates that this field optionally exists when configuring the gap pattern for the UE to execute the target task, such as a multi-SIM task. Otherwise, this field does not exist.

Alternatively, the non-independent target gap partially overlaps or completely overlaps with at least one measurement gap.

Alternatively, a plurality of gaps may overlap, including complete overlapping and partial overlapping.

Alternatively, a plurality of gaps configured in the first configuration information can overlap, including complete overlapping and partial overlapping.

Alternatively, the non-independent target gap can partially overlap or completely overlap with any other measurement gap.

Alternatively, the executing a target task based on the configuration information of the target gap includes at least one of:

- using the longest gap of all the overlapped gaps to execute a task corresponding to the longest gap;
- executing the target task using the non-independent target gap;
- ignoring a second measurement task, where the second measurement task is a task corresponding to the measurement gap partially overlapped or completely overlapped with the non-independent target gap; or
- executing a task corresponding to a part or all of the overlapped gaps using a gap time set of the part or all of the overlapped gaps.

All the overlapped gaps include the independent target gap and the measurement gap partially overlapped or completely overlapped with the independent target gap.

Alternatively, when the gap time overlaps, the terminal can use the longest gap of all the overlapped gaps to execute the corresponding task.

Alternatively, when the gap time overlaps, the terminal can use the target gap to execute the target task, such as a multi-SIM task.

Alternatively, when the gap time overlaps, the terminal can ignore other measurement gap purposes.

Alternatively, when the gap time overlaps, the terminal can use a gap time set with overlapped gaps, and execute tasks corresponding to a plurality of gaps within the set time.

Alternatively, the first configuration information includes: the configuration information of the non-independent target gap, and configuration information of other non-independent gaps.

The configuration information of the other non-independent gaps is configuration information for configuring the other non-independent gaps based on the configuration of the first measurement gap in the first measurement gap.

Alternatively, the first configuration information may include a plurality of sets of gap patterns, such as a gap pattern of the target gap and gap patterns of other measurement gaps.

Alternatively, when the first configuration information includes a plurality of sets of gap patterns, at least one set of gap patterns can enter into force, where the set of gap patterns entering into force may serve as the gap pattern of the target gap.

Alternatively, the plurality of sets of gap patterns included by the first configuration information may all be non-independent gaps configured in the first measurement gap based on the configuration of the first measurement gap.

Alternatively, the executing a target task based on the configuration information of the target gap includes:

- using the target gap only in a case that the target task is executed.

Alternatively, in a case that the target gap includes the independent target gap and/or the non-independent target gap, the target gap or an attribute of the target gap optionally exist when a target condition is met in the configuration of the target gap. For example, the target condition may include when the gap is configured for multi-SIM purposes or multi-SIM tasks.

For example, the terminal can be configured to use the target gap only in case of multi-SIM tasks.

Alternatively, the executing a target task based on the configuration information of the target gap includes:

- enabling the target gap to enter into force separately, or the target gap and at least one measurement gap to enter into force in parallel.

Alternatively, in a case that the target gap includes the independent target gap and/or the non-independent target gap, the target gap can enter into force in parallel with other measurement gaps, such as the measurement gap pattern of gapFR2, gapFR1 or gapUE.

Alternatively, in a case that the target gap includes the independent target gap and/or the non-independent target gap, the target gap can enter into force separately.

Alternatively, the target gap optionally enters into force. That is, the terminal can choose to use the target gap or not to use the target gap.

Alternatively, the terminal can selectively enable the target gap to enter into force or not enter into force based on the requirements of the task to be executed.

Alternatively, after receiving the configuration information of the target gap, the terminal can enable the target gap to enter into force at any time thereafter.

Alternatively, the method further includes:

the terminal transmits a configuration request of the target gap to the network-side device. The configuration request of the target gap is used for requesting the configuration information of the target gap.

The method further includes:

the terminal transmits a configuration request of the target gap to the network-side device.

The configuration request of the target gap includes at least one of:

a period of the target task; an execution duration of the target task; a request of a start time of the target gap; a request of a length of the target gap; a request of a period of the target gap; or a request of a frequency range of the target gap.

According to this embodiment of the present application, the terminal receives the configuration information of the target gap transmitted by the network-side device, and executes the measurement task and/or the non-measurement task based on the target gap; and by designing the configuration of the target gap, the gap requirements of multiple multi-SIM tasks are efficiently supported, and the impact of the multi-SIM tasks on the terminal data throughput is reduced.

FIG. 3 is another schematic flowchart of a gap configuration method according to an embodiment of the present application, and as shown in FIG. 3, the method includes the following steps:

Step 300: a network-side device determines configuration information of a target gap; and Step 310: the network-side device transmits first configuration information to a terminal, where the first configuration information includes the configuration information of the target gap.

The configuration information of the target gap is used for instructing the terminal to execute a target task at the target gap, and the target task includes a measurement task and/or a non-measurement task.

Alternatively, to overcome the defect that the measurement gap cannot support the UE to complete all types of multi-SIM tasks, a new configuration of the gap can be designed to meet the requirements of various types of target tasks, such as measurement tasks and/or non-measurement tasks.

Alternatively, the network-side device can determine the configuration information of the target gap, and can transmit the configuration information of the target gap to the terminal after determining the configuration information of the target gap.

Alternatively, the network-side device can transmit the first configuration information to the terminal, where the first configuration information includes the configuration information of the target gap.

Alternatively, after receiving the configuration information of the target gap, the terminal can determine the target gap based on the configuration information of the target gap, and can also use the target gap to execute the target task.

Alternatively, a gap attribute field set gap pattern of the target gap is an optionally configured gap type; which is different from gapFR2, gapFR1, gapUE and other gaps.

Alternatively, the terminal UE1 can receive a first configuration message transmitted by the network-side device, and the first configuration message can optionally include the configuration information of the target gap.

Alternatively, the target gap can be used by UE1 to execute the target task, such as a multi-SIM task, conversion of UE1 to other networks, and the like.

Alternatively, during the use the target gap, i.e., the target gap enters into force, UE1 can use the target gap to stop data transceiving; or continue normal data transceiving without using the target gap.

According to this embodiment of the present application, the terminal receives the configuration information of the target gap transmitted by the network-side device, and executes the measurement task and/or the non-measurement task based on the target gap; and by designing the configuration of the target gap, the gap requirements of multiple multi-SIM tasks are efficiently supported, and the impact of the multi-SIM tasks on the terminal data throughput is reduced.

Alternatively, the target task includes:

a multi-SIM task, where the multi-SIM task is a measurement task and/or a non-measurement task of other terminals, and the other terminals are associated with the terminal.

Alternatively, one feature of a multi-SIM terminal is that it can reside in a plurality of networks at the same time, but the implementation methods of the multi-SIM terminal are different, and some terminals can perform transmitting and receiving at the same time in a plurality of networks without affecting each other. There is also a multi-SIM terminal, and although the terminal can reside in a plurality of networks at the same time, it can reside in two networks in a time division manner, i.e., for a period of time, it resides in a network A to subject to paging of the network A, and for another period of time, it resides in a network B to subject to paging of the network B. Alternatively, it can connect to transceive data over the network A for a period of time, and it can receive paging over the network B for another period of time. Alternatively, it can receive data over the network A for a period of time, and it can establish a connection or transceive data over the network B for another period of time.

Alternatively, the multi-SIM task is a measurement task and/or a non-measurement task of other terminals UE2.

Alternatively, the terminal UE1 can execute the measurement task and/or the non-measurement task for UE2 at the target gap.

Alternatively, UE1 and UE2 may belong to a same physical device; such as SIM1 and SIM2 in a dual-SIM mobile phone.

Alternatively, UE1 and UE2 may be two associated UEs, such as a mobile terminal and a device communicated with the mobile terminal, and the device can communicate with the network-side device.

Alternatively, UE1 and UE2 may be two associated UEs, such as a mobile terminal and a device connected with the mobile terminal through Bluetooth, and the Bluetooth device can communicate with the network-side device.

Alternatively, UE1 and UE2 may belong to a same user; such as SIM1 and virtual SIM SIM2 in a mobile phone.

Alternatively, the determining configuration information of a target gap includes: configuring an independent target gap separately, or configuring the independent target gap simultaneously with at least one measurement gap.

Alternatively, the target gap configuration can be implemented in a variety of ways, including an independent target gap and/or a non-independent target gap, where:

the independent target gap can coexist with the traditional measurement gap or exist separately; and the non-independent target gap, for example, configures a target gap pattern based on a certain measurement gap.

Alternatively, the network-side device can configure an independent target gap for the terminal, and therefore the configuration information of the target gap may include: configuration information for configuring the independent target gap.

Alternatively, the independent target gap can be configured separately, for example, the network-side device can configure only the target gap.

Alternatively, the independent target gap is configured together with at least one measurement gap, for example, the network-side device can configure the target gap and one or more of the measurement gaps (such as gapFR2, gapFR1, and gapUE).

For example, the network-side device can configure the target gap and gapFR1 simultaneously.

For example, the network-side device can configure the target gap, gapFR1, and gapFR2 simultaneously.

Alternatively, the configuration information of the independent target gap includes at least one of:

a reference service cell where the target gap is located, and/or a cell group where the target gap is located;

an offset of the target gap;

a length of the target gap;

a period of the target gap;

or a frequency range of the target gap.

Alternatively, the configuration information of the independent target gap may include, but is not limited to, any one or any combination of the following:

a reference service cell where the target gap is located;

a cell group (a MCG, and an SCG) where the target gap is located;

an offset of the target gap;

a length of the target gap;

a period of the target gap;

a frequency range of the target gap.

For example, the network-side device can configure the target gap: GapMsim in an RRC reconfiguration message, or configure the target gap: GapMsim in MeasGapConfig IE.

The network-side device can configure an attribute of the target gap, including: the reference service cell (refServCellMsim-rxx) where the target gap is located, such as a master cell or a master-secondary cell;

the period of the target gap (mgrp-rxx), a value range, and an enumeration of {ms320, ms640, ms1280, ms2560};

the offset of the target gap (gapOffset-rxx), integer (0-2559);

the length of the target gap (mgl-rxx), N milliseconds, N being an integer; and in an attribute name, -rxx represents Release 17, Release 18, and the like.

Alternatively, the independent target gap partially overlaps or completely overlaps with at least one measurement gap.

Alternatively, a plurality of gaps may overlap, including complete overlapping and partial overlapping.

Alternatively, the independent target gap can partially overlap or completely overlap with any other measurement gap.

Alternatively, the determining configuration information of a target gap includes:

configuring a non-independent target gap based on configuration of a first measurement gap in the first measurement gap, where the non-independent target gap corresponds to a same reference service cell as the first measurement gap.

Alternatively, the target gap configuration can be implemented in a variety of ways, including an independent target gap and/or a non-independent target gap, where:

the independent target gap can coexist with the traditional measurement gap or exist separately; and the non-independent target gap, for example, configures a target gap pattern in a certain measurement gap.

Alternatively, for an existing first measurement gap, when a certain attribute, such as the length, of the first measurement gap cannot satisfy the execution of the target task, a non-independent target gap can be configured based on the configuration of the first measurement gap to meet the requirements of the task, and therefore the configuration information of the target gap may include the configuration information for configuring the non-independent target gap.

Alternatively, the non-independent target gap may correspond to a same reference service cell as any other gap.

During the use of the non-independent target gap, UE1 can use the non-independent target gap to stop data transceiving; or continue data transceiving without using the non-independent target gap.

Alternatively, the configuration information of the non-independent target gap includes at least one of:

an offset of the target gap;

a length of the target gap;

a period of the target gap;

or a frequency range of the target gap.

Alternatively, the configuration information of the non-independent target gap may include, but is not limited to, any one or any combination of the following: an offset of the target gap;

a length of the target gap;

a period of the target gap;

and a frequency range of the target gap.

For example, the network-side device can configure the target gap: GapMsim in an RRC reconfiguration message, or configure the gap pattern of the target gap: GapMsim in MeasGapConfig IE.

The network-side device can configure an attribute of the target gap, including: the period of the target gap (mgrp-rxx), a value range, and an enumeration of {ms320, ms640, ms1280, ms2560};

the offset of the target gap (gapOffset-rxx), integer (0-2559); and the length of the target gap (mgl-rxx), N milliseconds, N being an integer.

In an attribute name, -rxx represents Release 17, Release 18, and the like.

Alternatively, the non-independent target gap partially overlaps or completely overlaps with the target gap corresponding to at least one second target attribute set of at least one measurement gap.

Alternatively, a plurality of gaps may overlap, including complete overlapping and partial overlapping.

Alternatively, a plurality of gaps configured in the first configuration information can overlap, including complete overlapping and partial overlapping.

Alternatively, the non-independent target gap can partially overlap or completely overlap with any other measurement gap.

Alternatively, the first configuration information includes: the configuration information of the non-independent target gap, and configuration information of other non-independent gaps.

The configuration information of the other non-independent gaps is configuration information for configuring the other non-independent gaps based on the configuration of the first measurement gap in the first measurement gap.

Alternatively, the first configuration information may include a plurality of sets of gap patterns, such as a gap pattern of the target gap and gap patterns of other measurement gaps.

Alternatively, when the first configuration information includes a plurality of sets of gap patterns, at least one set of gap patterns can enter into force, where the set of gap patterns entering into force may serve as the gap pattern of the target gap.

Alternatively, the plurality of sets of gap patterns included by the first configuration information may all be non-independent gaps configured in the first measurement gap based on the configuration of the first measurement gap.

Alternatively, the determining configuration information of a target gap includes:

- determining the configuration information based on a configuration request of the target gap transmitted by the terminal; or
- determining the configuration information based on a protocol pre-definition.

The configuration request of the target gap includes at least one of:

- a period of the target task; an execution duration of the target task; a request of a start time of the target gap; a request of a length of the target gap; a request of a period of the target gap; or a request of a frequency range of the target gap.

Alternatively, when determining the configuration information of the target gap, the network-side device can determine the configuration information of the target gap corresponding to the request based on the configuration request of the target gap of the terminal.

Alternatively, when determining the configuration information of the target gap, the network-side device can determine the configuration information of the target gap based on the protocol pre-definition.

Alternatively, the configuration information is determined based on the configuration request of the target gap transmitted by the terminal, including at least one of:

- in a case that the configuration request of the target gap includes the period of the target task, the period of the target gap is determined based on the period of the target task;
- in a case that the configuration request of the target gap includes the execution duration of the target task, the length of the target gap is determined based on the execution duration of the target task;
- in a case that the configuration request of the target gap includes the request of the start time of the target gap, the offset of the target gap is determined based on the request of the start time of the target gap;
- in a case that the configuration request of the target gap includes the request of the length of the target gap, the length of the target gap is determined based on the request of the length of the target gap;
- in a case that the configuration request of the target gap includes the request of the period of the target gap, the period of the target gap is determined based on the request of the period of the target gap; or
- in a case that the configuration request of the target gap includes the request of the frequency range of the target gap, the frequency range of the target gap is determined based on the request of the frequency range of the target gap.

Alternatively, the terminal can transmit the configuration request of the target gap to the network-side, and the configuration request of the target gap may include relevant requirements of the target task or configuration requirements of the target gap.

Alternatively, the configuration request of the target gap may include the period of the target task, and when determining the period of the target gap, the network-side device can determine that the period of the target gap is longer than or equal to the period of the target task.

Alternatively, the configuration request of the target gap may include the request of the period of the target gap, and when determining the period of the target gap, the network-side device can determine that the period of the target gap is longer than or equal to the request of the period of the target gap.

Alternatively, the network-side device can determine the period of the target gap according to the request or protocol agreement reported by the UE.

Alternatively, the configuration request of the target gap may include the execution duration of the target task, and when determining the length of the target gap, the network-side device can determine that the length of the target gap is longer than or equal to the execution duration of the target task.

Alternatively, the configuration request of the target gap may include the request of the length of the target gap, and when determining the length of the target gap, the network-side device can determine that the length of the target gap is longer than or equal to the request of the length of the target gap.

Alternatively, the network-side device can determine the length of the target gap according to the request or protocol agreement reported by the UE.

Alternatively, the configuration request of the target gap may include the request of the frequency range of the target gap, and when determining the frequency range of the target gap, the network-side device can determine that the frequency range of the target gap includes or is equal to the request of the frequency range of the target gap.

Alternatively, the network-side device can determine the frequency range of the target gap according to the request or protocol agreement reported by the UE.

Alternatively, the network-side can simultaneously determine any one or any combination of the following:

- a frequency offset of the target gap; a length of the target gap; a period of the target gap; and a frequency range of the target gap.

Alternatively, the network-side can simultaneously determine any one or any combination of the following according to the request or protocol agreement reported by the UE:

- the frequency offset of the target gap; the length of the target gap; the period of the target gap; and the frequency range of the target gap.

For example, the configuration request of the target gap may include the period and the execution duration of the target task, and when determining the period and the length of the target gap, the network-side device can determine that the period of the target gap is longer than or contains the period of the target task, and determine that the length of the target gap is longer than or equal to the execution duration of the target task.

According to this embodiment of the present application, the terminal receives the configuration information of the target gap transmitted by the network-side device, and executes the measurement task and/or the non-measurement task based on the target gap; and by designing the configuration of the target gap, the gap requirements of multiple multi-SIM tasks are efficiently supported, and the impact of the multi-SIM tasks on the terminal data throughput is reduced.

It is to be noted that in the gap configuration method provided by the embodiments of the present application, an execution body may be a gap configuration apparatus, or a control module in the gap configuration apparatus for executing the gap configuration method. According to the embodiments of the present application, the gap configuration apparatus provided by the embodiments of the present application is described by taking the situation that the gap configuration apparatus executes the gap configuration method as an example.

FIG. 4 is a schematic structural diagram of a gap configuration apparatus according to an embodiment of the present application, and as shown in FIG. 4, the apparatus includes: a first receiving module 410 and a first execution module 420.

The first receiving module 410 is configured to receive first configuration information transmitted by a network-side device, where the first configuration information includes configuration information of a target gap.

The first execution module 420 is configured to execute a target task based on the configuration information of the target gap.

The target task includes a measurement task and/or a non-measurement task.

Alternatively, the gap configuration apparatus can receive the first configuration information transmitted by the network-side device via the first receiving module 410, where the first configuration information includes the configuration information of the target gap; and the target task can also be executed by the first execution module 420 based on the configuration information of the target gap.

According to this embodiment of the present application, the terminal receives the configuration information of the target gap transmitted by the network-side device, and executes the measurement task and/or the non-measurement task based on the target gap; and by designing the configuration of the target gap, the gap requirements of multiple multi-SIM tasks are efficiently supported, and the impact of the multi-SIM tasks on the terminal data throughput is reduced.

Alternatively, the target task includes:

a multi-SIM task, where the multi-SIM task is a measurement task and/or a non-measurement task of other terminals, and the other terminals are associated with the terminal.

Alternatively, the configuration information of the target gap includes:

configuration information for configuring an independent target gap.

The independent target gap is configured separately, or the independent target gap is configured together with at least one measurement gap.

Alternatively, the configuration information of the independent target gap includes at least one of:

a reference service cell where the target gap is located, and/or a cell group where the target gap is located;

an offset of the target gap;

a length of the target gap;

a period of the target gap;

or a frequency range of the target gap.

Alternatively, the first execution module is further configured to:

use the configuration information of the independent target gap; and ignore configuration information in a same cell with the configuration information of the independent target gap and configuring a same information type as the configuration information of the target gap.

Alternatively, the independent target gap partially overlaps or completely overlaps with at least one measurement gap.

Alternatively, the first execution module is further configured to:

use the longest gap of all the overlapped gaps to execute a task corresponding to the longest gap, where all the overlapped gaps include the independent target gap and the measurement gap partially overlapped or completely overlapped with the independent target gap;

execute the target task using the independent target gap; and ignore a first measurement task, where the first measurement task is a task corresponding to the measurement gap partially overlapped or completely overlapped with the independent target gap.

Alternatively, the configuration information of the target gap includes:

configuration information for configuring a non-independent target gap based on configuration of a first measurement gap in the first measurement gap, where the non-independent target gap corresponds to a same reference service cell as the first measurement gap.

Alternatively, the configuration information of the non-independent target gap includes at least one of:

an offset of the target gap;

a length of the target gap;

a period of the target gap;

or a frequency range of the target gap.

Alternatively, the non-independent target gap partially overlaps or completely overlaps with at least one measurement gap.

Alternatively, the first execution module is further configured to:

use the longest gap of all the overlapped gaps to execute a task corresponding to the longest gap;

execute the target task using the non-independent target gap;

ignore a second measurement task, where the second measurement task is a task corresponding to the measurement gap partially overlapped or completely overlapped with the non-independent target gap; and execute a task corresponding to a part or all of the overlapped gaps using a gap time set of the part or all of the overlapped gaps.

All the overlapped gaps include the independent target gap and the measurement gap partially overlapped or completely overlapped with the independent target gap.

Alternatively, the first configuration information includes: the configuration information of the non-independent target gap, and configuration information of other non-independent gaps.

The configuration information of the other non-independent gaps is configuration information for configuring the other non-independent gaps based on the configuration of the first measurement gap in the first measurement gap.

Alternatively, the first execution module is further configured to:

use the target gap only in a case that the target task is executed.

Alternatively, the first execution module is further configured to:

enable the target gap to enter into force separately, or the target gap and at least one measurement gap to enter into force in parallel.

Alternatively, the apparatus further includes:

a second transmission module, which is configured to transmit a configuration request of the target gap to the network-side device.

The configuration request of the target gap includes at least one of:

a period of the target task; an execution duration of the target task; a request of a start time of the target gap; a request of a length of the target gap; a request of a period of the target gap; or a request of a frequency range of the target gap.

According to this embodiment of the present application, the terminal receives the configuration information of the target gap transmitted by the network-side device, and executes the measurement task and/or the non-measurement task based on the target gap; and by designing the configuration of the target gap, the gap requirements of multiple multi-SIM tasks are efficiently supported, and the impact of the multi-SIM tasks on the terminal data throughput is reduced.

The gap configuration apparatus according to this embodiment of the present application may be an apparatus or an electronic device having an operating system, or may be a component, an integrated circuit, or a chip in the terminal. The electronic device may be a mobile terminal or a non-mobile terminal. Illustratively, the mobile terminal may include, but is not limited to, the types of the terminal 11 listed above, and the non-mobile terminal may be a server, a network attached storage (NAS), a personal computer (PC), a television (TV), a teller machine or a self-service machine, and the like, which are not particularly limited by this embodiment of the present application.

The gap configuration apparatus according to this embodiment of the present application may realize the various processes achieved by the method embodiment of FIG. 2 and achieve the same technical effect, which will not be described in detail herein again to avoid repetition.

Figure 5:
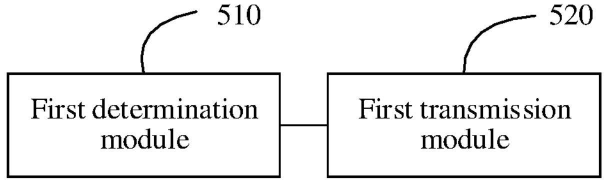
FIG. 5 is another schematic structural diagram of a gap configuration apparatus according to an embodiment of the present application.

FIG. 5 is another schematic structural diagram of a gap configuration apparatus according to an embodiment of the present application, and as shown in FIG. 5, the apparatus includes: a first determination module 510 and a first transmission module 520.

The first determination module 510 is configured to determine configuration information of a target gap.

The first transmission module 520 is configured to transmit first configuration information to a terminal, where the first configuration information includes the configuration information of the target gap.

The configuration information of the target gap is used for instructing the terminal to execute a target task at the target gap, and the target task includes a measurement task and/or a non-measurement task.

Alternatively, the gap configuration apparatus can determine the configuration information of the target gap via the first determination module 510, and can also transmit the first configuration information to the terminal via the first transmission module 520. The first configuration information includes the configuration information of the target gap and instructs the terminal to execute a target task at the target gap, and the target task includes a measurement task and/or a non-measurement task.

According to this embodiment of the present application, the terminal receives the configuration information of the target gap transmitted by the network-side device, and executes the measurement task and/or the non-measurement task based on the target gap; and by designing the configuration of the target gap, the gap requirements of multiple multi-SIM tasks are efficiently supported, and the impact of the multi-SIM tasks on the terminal data throughput is reduced.

Alternatively, the target task includes:

a multi-SIM task, where the multi-SIM task is a measurement task and/or a non-measurement task of other terminals, and the other terminals are associated with the terminal.

Alternatively, the first determination module is further configured to:

configure an independent target gap separately, or configure the independent target gap simultaneously with at least one measurement gap.

Alternatively, the configuration information of the independent target gap includes at least one of:

a reference service cell where the target gap is located, and/or a cell group where the target gap is located;

an offset of the target gap;

a length of the target gap;

a period of the target gap;

or a frequency range of the target gap.

Alternatively, the independent target gap partially overlaps or completely overlaps with at least one measurement gap.

Alternatively, the first determination module is further configured to:

configure a non-independent target gap based on configuration of a first measurement gap in the first measurement gap, where the non-independent target gap corresponds to a same reference service cell as the first measurement gap.

Alternatively, the configuration information of the non-independent target gap includes at least one of:

an offset of the target gap;

a length of the target gap;

a period of the target gap;

or a frequency range of the target gap.

Alternatively, the non-independent target gap partially overlaps or completely overlaps with the target gap corresponding to at least one second target attribute set of at least one measurement gap.

Alternatively, the first configuration information includes: the configuration information of the non-independent target gap, and configuration information of other non-independent gaps.

The configuration information of the other non-independent gaps is configuration information for configuring the other non-independent gaps based on the configuration of the first measurement gap in the first measurement gap.

Alternatively, the first determination module is further configured to:

determine the configuration information based on a configuration request of the target gap transmitted by the terminal; or determine the configuration information based on a protocol pre-definition.

The configuration request of the target gap includes at least one of:

a period of the target task; an execution duration of the target task; a request of a start time of the target gap; a request of a length of the target gap; a request of a period of the target gap; or a request of a frequency range of the target gap.

Alternatively, the first determination module is further configured to execute at least one of:

in a case that the configuration request of the target gap includes the period of the target task, determine the period of the target gap based on the period of the target task;

in a case that the configuration request of the target gap includes the execution duration of the target task, determine the length of the target gap based on the execution duration of the target task;

in a case that the configuration request of the target gap includes the request of the start time of the target gap, determine the offset of the target gap based on the request of the start time of the target gap;

in a case that the configuration request of the target gap includes the request of the length of the target gap, determine the length of the target gap based on the request of the length of the target gap;

in a case that the configuration request of the target gap includes the request of the period of the target gap, determine the period of the target gap based on the request of the period of the target gap; or in a case that the configuration request of the target gap includes the request of the frequency range of the target gap, determine the frequency range of the target gap based on the request of the frequency range of the target gap.

According to this embodiment of the present application, the terminal receives the configuration information of the target gap transmitted by the network-side device, and executes the measurement task and/or the non-measurement task based on the target gap; and by designing the configuration of the target gap, the gap requirements of multiple multi-SIM tasks are efficiently supported, and the impact of the multi-SIM tasks on the terminal data throughput is reduced.

The gap configuration apparatus according to this embodiment of the present application may be an apparatus or may be a component, an integrated circuit, or a chip in the terminal. The apparatus may be a mobile terminal or a non-mobile terminal. Illustratively, the mobile terminal may include, but is not limited to, the types of the terminal 11 listed above, and the non-mobile terminal may be a server, a network attached storage (NAS), a personal computer (PC), a television (TV), a teller machine or a self-service machine, and the like, which are not particularly limited by this embodiment of the present application.

The gap configuration apparatus according to this embodiment of the present application may be an apparatus having an operating system. The operating system may be an Android operating system, may be an ios operating system, and may also be other possible operating systems, and there is no specific limitation in this embodiment of the present application.

The gap configuration apparatus according to this embodiment of the present application may realize the various processes achieved by the method embodiment of FIG. 3 and achieve the same technical effect, which will not be described in detail herein again to avoid repetition.

Figure 6:
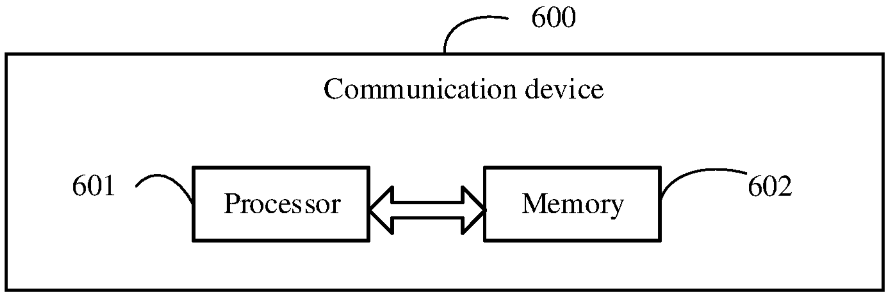
FIG. 6 is a schematic structural diagram of a communication device according to an embodiment of the present application.

Alternatively, FIG. 6 is a schematic structural diagram of a communication device according to an embodiment of the present application, and as shown in FIG. 6, a communication device 600 includes a processor 601, a memory 602, and a program or instruction stored in the memory 602 and executable on the processor 601. For example, in a case that the communication device 600 is a terminal, when executed by the processor 601, the program or instruction implements the various processes of the above method embodiment, and the same technical effect may be achieved. In a case that the communication device 600 is a network-side device, when executed by the processor 601, the program or instruction implements various processes of the above method embodiment, and the same technical effect may be achieved, which will not be described in detail herein again to avoid repetition.

Figure 7:
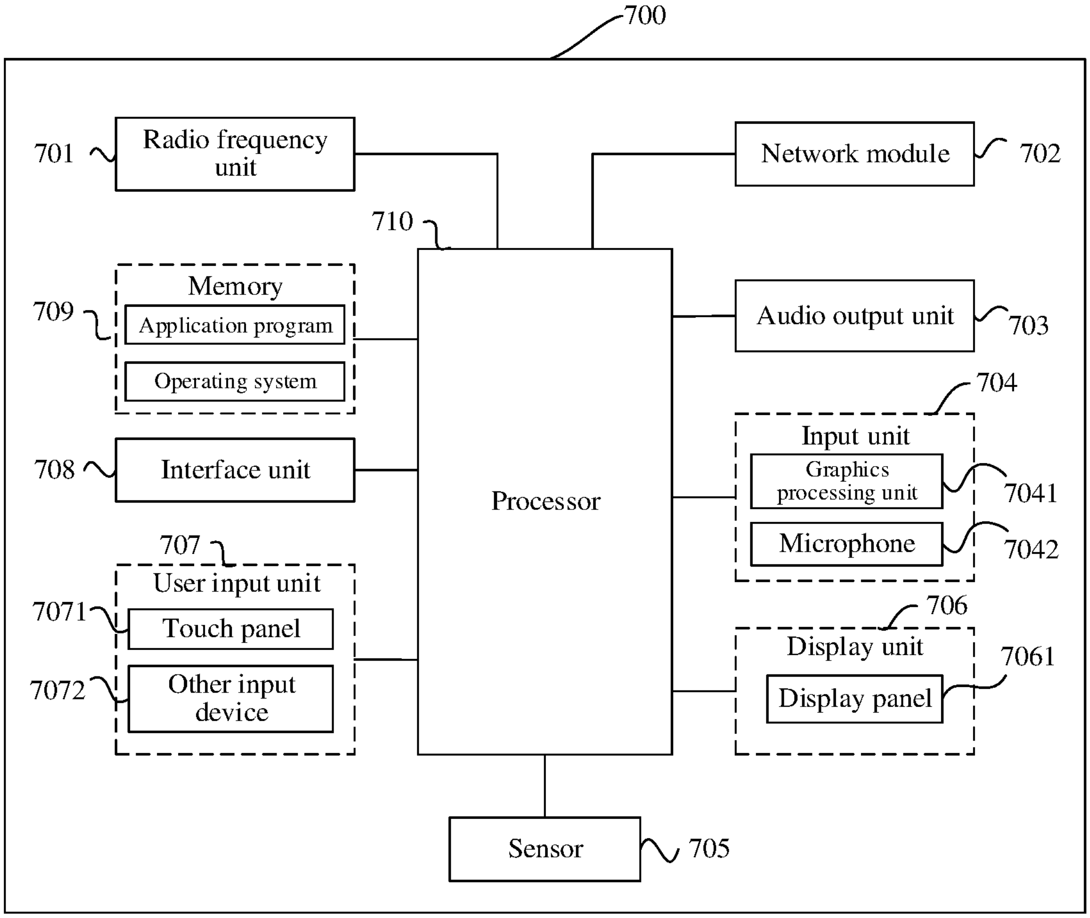
FIG. 7 is a schematic structural diagram of hardware of a terminal according to an embodiment of the present application.

FIG. 7 is a schematic structural diagram of hardware of a terminal according to an embodiment of the present application.

A terminal 700 includes, but is not limited to: at least some of the components of a radio frequency unit 701, a network module 702, an audio output unit 703, an input unit 704, a sensor 705, a display unit 706, a user input unit 707, an interface unit 708, a memory 709, and a processor 710.

As will be appreciated by a person skilled in the art, the terminal 700 may further include a power supply (e.g., a battery) for supplying power to the various components, and the power supply can be logically connected to the processor 710 via a power management system, so as to realize charging-discharging management, power consumption management and other functions via the power management system. The terminal structure shown in FIG. 7 constitutes no limitation on the terminal, and the terminal may include more or fewer components than those shown in the figure, or some components may be combined, or a different component deployment may be used, which will not be described in detail herein again.

It is to be understood that according to this embodiment of the present application, the input unit 704 may include a graphics processing unit (GPU) 7041 and a microphone 7042. The graphics processing unit 7041 processes image data of a static picture or a video obtained by an image acquisition apparatus (e.g., a camera) in a video acquisition mode or an image acquisition mode. The display unit 706 may include a display panel 7061. The display panel 7061 may be configured in the form of a liquid crystal display, an organic light-emitting diode, and the like. The user input unit 707 includes a touch panel 7071 and one other input device 7072. The touch panel 7071 is also referred to as a touch screen. The touch panel 7071 may include two parts, namely a touch detection apparatus and a touch controller. The other input device 7072 may include, but is not limited to, a physical keyboard, function keys (such as a volume control key, or a switch key), a trackball, a mouse, a joystick, and the like, which will not be described in detail herein again.

According to this embodiment of the present application, the radio frequency unit 701 receives information from a communication peer and then processes the information by the processor 710. In addition, the information to be transmitted is transmitted to the communication peer. In general, the radio frequency unit 701 includes, but is not limited to, an antenna, at least one amplifier, a transceiver, a coupler, a low noise amplifier, a duplexer, and the like.

The memory 709 can be configured to store software programs or instructions as well as various data. The memory 709 may mainly include a program or instruction storage area and a data storage area. The program or instruction storage area may store an operating system, an application program or instruction required by at least one function (such as a sound playback function and an image play function), and the like. In addition, the memory 709 may include a high-speed random-access memory, and may also include a non-volatile memory. The non-volatile memory may be a read-only memory (ROM), a programmable ROM (PROM), an erasable PROM (EPROM), an electrically EPROM (EEPROM), or a flash memory. For example, at least one disk storage device, flash memory device, or other non-volatile solid state storage devices.

The processor 710 may include one or more processing units. Alternatively, the processor 710 may integrate an application processor and a modem processor. The application processor is mainly used for processing an operating system, a user interface, an application program or instruction, and the like, and the modem processor is mainly used for processing wireless communication, such as a baseband processor. It is to be understood that the modem processor may not be integrated into the processor 710.

The processor 710 is configured to:

receive, by a terminal, first configuration information transmitted by a network-side device, where the first configuration information includes configuration information of a target gap; and execute, by the terminal, a target task based on the configuration information of the target gap.

The target task includes a measurement task and/or a non-measurement task.

According to this embodiment of the present application, the terminal receives the configuration information of the target gap transmitted by the network-side device, and executes the measurement task and/or the non-measurement task based on the target gap; and by designing the configuration of the target gap, the gap requirements of multiple multi-SIM tasks are efficiently supported, and the impact of the multi-SIM tasks on the terminal data throughput is reduced.

Alternatively, the target task includes:

a multi-SIM task, where the multi-SIM task is a measurement task and/or a non-measurement task of other terminals, and the other terminals are associated with the terminal.

Alternatively, the configuration information of the target gap includes:

configuration information for configuring an independent target gap.

The independent target gap is configured separately, or the independent target gap is configured together with at least one measurement gap.

Alternatively, the configuration information of the independent target gap includes at least one of:

a reference service cell where the target gap is located, and/or a cell group where the target gap is located;

an offset of the target gap;

a length of the target gap;

a period of the target gap;

or a frequency range of the target gap.

Alternatively, the processor 710 is configured to:

use the configuration information of the independent target gap; and ignore configuration information in a same cell with the configuration information of the independent target gap and configuring a same information type as the configuration information of the target gap.

Alternatively, the independent target gap partially overlaps or completely overlaps with at least one measurement gap.

Alternatively, the processor 710 is configured to execute at least one of:

use the longest gap of all the overlapped gaps to execute a task corresponding to the longest gap, where all the overlapped gaps include the independent target gap and the measurement gap partially overlapped or completely overlapped with the independent target gap;

execute the target task using the independent target gap; or ignore a first measurement task, where the first measurement task is a task corresponding to the measurement gap partially overlapped or completely overlapped with the independent target gap.

Alternatively, the configuration information of the target gap includes:

configuration information for configuring a non-independent target gap based on configuration of a first measurement gap in the first measurement gap, where the non-independent target gap corresponds to a same reference service cell as the first measurement gap.

Alternatively, the configuration information of the non-independent target gap includes at least one of:

an offset of the target gap;

a length of the target gap;

a period of the target gap;

or a frequency range of the target gap.

Alternatively, the non-independent target gap partially overlaps or completely overlaps with at least one measurement gap.

Alternatively, the processor 710 is configured to execute at least one of:

use the longest gap of all the overlapped gaps to execute a task corresponding to the longest gap;

execute the target task using the non-independent target gap;

ignore a second measurement task, where the second measurement task is a task corresponding to the measurement gap partially overlapped or completely overlapped with the non-independent target gap; or execute a task corresponding to a part or all of the overlapped gaps using a gap time set of the part or all of the overlapped gaps.

All the overlapped gaps include the independent target gap and the measurement gap partially overlapped or completely overlapped with the independent target gap.

Alternatively, the first configuration information includes: the configuration information of the non-independent target gap, and configuration information of other non-independent gaps.

The configuration information of the other non-independent gaps is configuration information for configuring the other non-independent gaps based on the configuration of the first measurement gap in the first measurement gap.

Alternatively, the processor 710 is configured to:

use the target gap only in a case that the target task is executed.

Alternatively, the processor 710 is configured to:

enable the target gap to enter into force separately, or the target gap and at least one measurement gap to enter into force in parallel.

Alternatively, the processor 710 is configured to:

transmit, by the terminal, a configuration request of the target gap to the network-side device.

The configuration request of the target gap includes at least one of:

a period of the target task; an execution duration of the target task; a request of a start time of the target gap; a request of a length of the target gap; a request of a period of the target gap; or a request of a frequency range of the target gap.

According to this embodiment of the present application, the terminal receives the configuration information of the target gap transmitted by the network-side device, and executes the measurement task and/or the non-measurement task based on the target gap; and by designing the configuration of the target gap, the gap requirements of multiple multi-SIM tasks are efficiently supported, and the impact of the multi-SIM tasks on the terminal data throughput is reduced.

The terminal embodiment according to this embodiment of the present application is a product embodiment corresponding to the above method embodiment. All the implementation methods in the above method embodiment are applicable to this terminal embodiment, and the same or similar technical effects may also be achieved, which will not be described in detail herein again.

Figure 8:
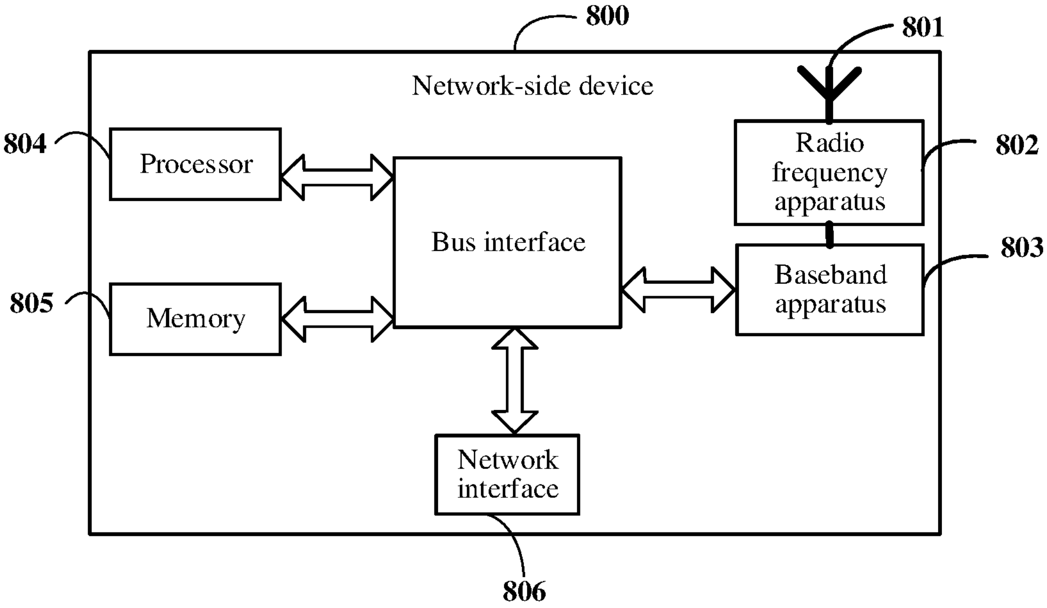
FIG. 8 is a schematic structural diagram of hardware of a network-side device according to an embodiment of the present application.

FIG. 8 is a schematic structural diagram of hardware of a network-side device according to an embodiment of the present application.

As shown in FIG. 8, a network-side device 800 includes: an antenna 801, a radio frequency apparatus 802, and a baseband apparatus 803. The antenna 801 is connected with the radio frequency apparatus 802. In an uplink direction, the radio frequency apparatus 802 receives information via the antenna 801 and transmits the received information to the baseband apparatus 803 for processing. In a downlink direction, the baseband apparatus 803 processes information to be transmitted and transmits the information to the radio frequency apparatus 802, and the radio frequency apparatus 802 processes the received information and transmits the information out via the antenna 801.

The above frequency band processing apparatus may be located in the baseband apparatus 803, and the method executed by the network-side device in the above embodiments may be implemented in the baseband apparatus 803. The baseband apparatus 803 includes a processor 804 and a memory 805.

The baseband apparatus 803, for example, may include at least one baseband board. The baseband board is provided with a plurality of chips, as shown in FIG. 8, one of the chips, for example the processor 804, is connected with the memory 805, so as to invoke a program in the memory 805 to execute the network device operations as shown in the above method embodiment.

The baseband apparatus 803 may further include a network interface 806 for performing information exchange with the radio frequency apparatus 802. The interface is, for example, a common public radio interface (CPRI).

In some embodiments, the network-side device according to this embodiment of the present application further includes: an instruction or program stored on the memory 805 and executable on the processor 804, and the processor 804 calls the instruction or program in the memory 805 to execute the method executed by each module as shown in FIG. 3, and the same technical effect may be achieved, which will not be described in detail herein again to avoid repetition.

The processor 804 is configured to:

determine, by the network-side device, configuration information of a target gap; and transmit, by the network-side device, first configuration information to a terminal, where the first configuration information includes the configuration information of the target gap.

The configuration information of the target gap is used for instructing the terminal to execute a target task at the target gap, and the target task includes a measurement task and/or a non-measurement task.

According to this embodiment of the present application, the terminal receives the configuration information of the target gap transmitted by the network-side device, and executes the measurement task and/or the non-measurement task based on the target gap; and by designing the configuration of the target gap, the gap requirements of multiple multi-SIM tasks are efficiently supported, and the impact of the multi-SIM tasks on the terminal data throughput is reduced.

Alternatively, the target task includes:

a multi-SIM task, where the multi-SIM task is a measurement task and/or a non-measurement task of other terminals, and the other terminals are associated with the terminal.

Alternatively, the processor 804 is configured to:

configure an independent target gap separately, or configure the independent target gap simultaneously with at least one measurement gap.

Alternatively, the configuration information of the independent target gap includes at least one of:

a reference service cell where the target gap is located, and/or a cell group where the target gap is located;

an offset of the target gap;

a length of the target gap;

a period of the target gap;

or a frequency range of the target gap.

Alternatively, the independent target gap partially overlaps or completely overlaps with at least one measurement gap.

Alternatively, the processor 804 is configured to:

configure a non-independent target gap based on configuration of a first measurement gap in the first measurement gap, where the non-independent target gap corresponds to a same reference service cell as the first measurement gap.

Alternatively, the configuration information of the non-independent target gap includes at least one of:

an offset of the target gap;

a length of the target gap;

a period of the target gap;

or a frequency range of the target gap.

Alternatively, the non-independent target gap partially overlaps or completely overlaps with the target gap corresponding to at least one second target attribute set of at least one measurement gap.

Alternatively, the first configuration information includes: the configuration information of the non-independent target gap, and configuration information of other non-independent gaps.

The configuration information of the other non-independent gaps is configuration information for configuring the other non-independent gaps based on the configuration of the first measurement gap in the first measurement gap.

Alternatively, the processor 804 is configured to:

determine the configuration information based on a configuration request of the target gap transmitted by the terminal; or determine the configuration information based on a protocol pre-definition.

The configuration request of the target gap includes at least one of:

a period of the target task; an execution duration of the target task; a request of a start time of the target gap; a request of a length of the target gap; a request of a period of the target gap; or a request of a frequency range of the target gap.

Alternatively, the processor 804 is configured to execute at least one of: in a case that the configuration request of the target gap includes the period of the target task, determine the period of the target gap based on the period of the target task; in a case that the configuration request of the target gap includes the execution duration of the target task, determine the length of the target gap based on the execution duration of the target task;

in a case that the configuration request of the target gap includes the request of the start time of the target gap, determine the offset of the target gap based on the request of the start time of the target gap;

in a case that the configuration request of the target gap includes the request of the length of the target gap, determine the length of the target gap based on the request of the length of the target gap;

in a case that the configuration request of the target gap includes the request of the period of the target gap, determine the period of the target gap based on the request of the period of the target gap; or in a case that the configuration request of the target gap includes the request of the frequency range of the target gap, determine the frequency range of the target gap based on the request of the frequency range of the target gap.

According to this embodiment of the present application, the terminal receives the configuration information of the target gap transmitted by the network-side device, and executes the measurement task and/or the non-measurement task based on the target gap; and by designing the configuration of the target gap, the gap requirements of multiple multi-SIM tasks are efficiently supported, and the impact of the multi-SIM tasks on the terminal data throughput is reduced.

The network-side device embodiment according to this embodiment of the present application is a product embodiments corresponding to the above method embodiment. All the implementation methods in the above method embodiment are applicable to this network-side device embodiment, and the same or similar technical effects may also be achieved, which will not be described in detail herein again.

The embodiments of the present application further provide a non-transitory readable storage medium. The non-transitory readable storage medium stores a program or instruction, and when executed by a processor, the program or instruction implements the various processes of the above embodiment of the gap configuration method, and the same technical effect may be achieved, which will not be described in detail herein again to avoid repetition.

The processor is a processor in the terminal described in the above embodiment. The non-transitory readable storage medium includes a non-transitory computer readable storage medium, such as a computer read-only memory (ROM), a random-access memory (RAM), a magnetic disk or an optical disk, and the like.

The embodiments of the present application further provide a chip. The chip includes a processor and a communication interface. The communication interface is coupled to the processor. The processor is configured to run a network-side device program or instruction to implement various processes of the above embodiment of the gap configuration method, and the same technical effect may be achieved, which will not be described in detail herein again to avoid repetition.

It is to be understood that the chip referred to in this embodiment of the present application may also be referred to as system on chip, system-on-a-chip, system-on-chip, or SOC, and the like.

It is to be noted that the terms "include", "comprise", or any other variation thereof in this specification are intended to cover a non-exclusive inclusion, such that a process, method, article, or apparatus that includes a list of elements not only includes those elements, but also includes other elements not expressly listed or also includes elements inherent to such process, method, article, or apparatus. Without more limitations, elements defined by the phrase "including one" does not exclude the presence of additional elements in a process, method, article, or apparatus that includes these elements. Further, it is to be noted that the scope of the methods and apparatuses according to the embodiments of the present application is not limited to performing the functions in the order shown or discussed, and may include performing the functions in a substantially simultaneous manner or in a reverse order according to the functions involved, e.g., the methods described may be performed in an order different from that described, and various steps may also be added, omitted, or combined. In addition, features described with reference to certain examples may be combined in other examples.

From the description in the above embodiments, a person skilled in the art may clearly learn that the above method embodiments may be implemented by means of software plus a necessary general hardware platform, and of course, it may also be implemented by means of hardware; but in most cases, the former is the preferred embodiment. Based on such an understanding, the technical solutions of the present application essentially, or the part contributing to the prior art, may be presented in the form of a software product. The computer software product is stored in a storage medium (for example, an ROM/RAM, a magnetic disk, or an optical disk), which includes several instructions to enable a terminal (which may be a mobile phone, a computer, a server, a network device, or the like) to execute the methods described in the embodiments of the present application.

The embodiments of the present application have been described above with reference to the accompanying drawings, but the present application is not limited to the specific embodiments described above. The specific embodiments described above are merely illustrative and not restrictive. Those of ordinary skill in the art may make various variations under the teaching of the present application without departing from the spirit of the present application and the protection scope of the claims, and such variations shall all fall within the protection scope of the present application.

What is claimed is:

1. A gap configuration method, comprising:

receiving, by a terminal, first configuration information transmitted by a network-side device, wherein the first configuration information comprises configuration information of a target gap; and executing, by the terminal, a target task based on the configuration information of the target gap;

wherein the target gap is used for the terminal to execute a multi-SIM task; and the target task comprises a measurement task and/or a non-measurement task;

wherein the configuration information of the target gap comprises:

configuration information for configuring an independent target gap;

wherein the independent target gap partially overlaps or completely overlaps with at least one measurement gap; and wherein executing the target task based on the configuration information of the target gap comprises:

ignoring a first measurement task, wherein the first measurement task is a task corresponding to a measurement gap partially overlapped or completely overlapped with the independent target gap.

2. The gap configuration method according to claim 1, wherein the target task comprises:

the multi-SIM task, wherein the multi-SIM task is a measurement task and/or a non-measurement task of other terminals, and the other terminals are associated with the terminal.

3. The gap configuration method according to claim 1, wherein the independent target gap is configured separately, or the independent target gap is configured together with the at least one measurement gap.

4. The gap configuration method according to claim 1, wherein configuration information of the independent target gap comprises at least one of:

a reference service cell where the target gap is located, and/or a cell group where the target gap is located;

an offset of the target gap;

a length of the target gap;

a period of the target gap; or a frequency range of the target gap;

wherein the executing a target task based on the configuration information of the target gap further comprises:

using the configuration information of the independent target gap; and ignoring configuration information in a same cell with the configuration information of the independent target gap and configuring a same information type as the configuration information of the target gap.

5. The gap configuration method according to claim 4, wherein the executing a target task based on the configuration information of the target gap further comprises at least one of:

using the longest gap of all overlapped gaps to execute a task corresponding to the longest gap, wherein all the overlapped gaps comprise the independent target gap and the measurement gap partially overlapped or completely overlapped with the independent target gap; or executing the target task using the independent target gap.

6. The gap configuration method according to claim 1, wherein the configuration information of the target gap further comprises:

configuration information for configuring a non-independent target gap based on configuration of a first measurement gap in the first measurement gap, wherein the non-independent target gap corresponds to a same reference service cell as the first measurement gap;

wherein configuration information of the non-independent target gap comprises at least one of:

an offset of the target gap;

a length of the target gap;

a period of the target gap; or a frequency range of the target gap.

7. The gap configuration method according to claim 6, wherein the non-independent target gap partially overlaps or completely overlaps with at least one measurement gap;

wherein the executing a target task based on the configuration information of the target gap further comprises at least one of:

using the longest gap of all overlapped gaps to execute a task corresponding to the longest gap;

executing the target task using the non-independent target gap;

ignoring a second measurement task, wherein the second measurement task is a task corresponding to the measurement gap partially overlapped or completely overlapped with the non-independent target gap; or executing a task corresponding to a part or all of the overlapped gaps using a gap time set of the part or all of the overlapped gaps;

wherein all the overlapped gaps comprise the independent target gap and the measurement gap partially overlapped or completely overlapped with the independent target gap.

8. The gap configuration method according to claim 6, wherein the first configuration information comprises: the configuration information of the non-independent target gap, and configuration information of other non-independent gaps;

wherein the configuration information of the other non-independent gaps is configuration information for configuring the other non-independent gaps based on the configuration of the first measurement gap in the first measurement gap.

9. The gap configuration method according to claim 4, wherein the executing a target task based on the configuration information of the target gap further comprises:

using the target gap only in a case that the target task is executed; or enabling the target gap to enter into force separately, or the target gap and at least one measurement gap to enter into force in parallel.

10. The gap configuration method according to claim 1, wherein the method further comprises:

transmitting, by the terminal, a configuration request of the target gap to the network-side device;

wherein the configuration request of the target gap comprises at least one of:

a period of the target task; an execution duration of the target task; a request of a start time of the target gap; a request of a length of the target gap; a request of a period of the target gap; or a request of a frequency range of the target gap.

11. A gap configuration method, comprising:

determining, by a network-side device, configuration information of a target gap; and transmitting, by the network-side device, first configuration information to a terminal, wherein the first configuration information comprises the configuration information of the target gap;

wherein the target gap is used for the terminal to execute a multi-SIM task; and the configuration information of the target gap is used for instructing the terminal to execute a target task at the target gap, and the target task comprises a measurement task and/or a non-measurement task;

wherein the configuration information of the target gap comprises:

configuration information for configuring an independent target gap;

wherein the independent target gap partially overlaps or completely overlaps with the at least one measurement gap; and wherein the target task further comprises: ignoring a first measurement task, wherein the first measurement task is a task corresponding to a measurement gap partially overlapped or completely overlapped with the independent target gap.

12. The gap configuration method according to claim 11, wherein the target task comprises:

the multi-SIM task, wherein the multi-SIM task is a measurement task and/or a non-measurement task of other terminals, and the other terminals are associated with the terminal.

13. The gap configuration method according to claim 11, wherein the determining configuration information of a target gap comprises:

configuring an independent target gap separately, or configuring the independent target gap simultaneously with the at least one measurement gap.

14. The gap configuration method according to claim 13, wherein configuration information of the independent target gap comprises at least one of:

a reference service cell where the target gap is located, and/or a cell group where the target gap is located;

an offset of the target gap;

a length of the target gap;

a period of the target gap; or a frequency range of the target gap.

15. The gap configuration method according to claim 11, wherein the determining configuration information of a target gap comprises:

configuring a non-independent target gap based on configuration of a first measurement gap in the first measurement gap, wherein the non-independent target gap corresponds to a same reference service cell as the first measurement gap.

16. The gap configuration method according to claim 15, wherein configuration information of the non-independent target gap comprises at least one of:

an offset of the target gap;

a length of the target gap;

a period of the target gap; or a frequency range of the target gap;

wherein the non-independent target gap partially overlaps or completely overlaps with the target gap corresponding to at least one second target attribute set of at least one measurement gap.

17. The gap configuration method according to claim 16, wherein the first configuration information comprises: the configuration information of the non-independent target gap, and configuration information of other non-independent gaps;

wherein the configuration information of the other non-independent gaps is configuration information for configuring the other non-independent gaps based on the configuration of the first measurement gap in the first measurement gap.

18. The gap configuration method according to claim 14, wherein the determining configuration information of a target gap comprises:

determining the configuration information based on a configuration request of the target gap transmitted by the terminal; or determining the configuration information based on a protocol pre-definition;

wherein the configuration request of the target gap comprises at least one of:

a period of the target task; an execution duration of the target task; a request of a start time of the target gap; a request of a length of the target gap; a request of a period of the target gap; or a request of a frequency range of the target gap.

19. A terminal, comprising a processor, a memory, and a program or instruction stored on the memory and executable on the processor, wherein the program or instruction, when executed by the processor, causes the terminal to perform:

receiving first configuration information transmitted by a network-side device, wherein the first configuration information comprises configuration information of a target gap; and executing a target task based on the configuration information of the target gap;

wherein the target gap is used for the terminal to execute a multi-SIM task; and the target task comprises a measurement task and/or a non-measurement task;

wherein the configuration information of the target gap comprises:

configuration information for configuring an independent target gap;

wherein the independent target gap partially overlaps or completely overlaps with the at least one measurement gap; and wherein executing the target task based on the configuration information of the target gap comprises:

ignoring a first measurement task, wherein the first measurement task is a task corresponding to a measurement gap partially overlapped or completely overlapped with the independent target gap.

20. A network-side device, comprising a processor, a memory, and a program or instruction stored on the memory and executable on the processor, wherein when executed by the processor, the program or instruction implements steps of the gap configuration method according to claim 11.

* * * * *